United States Patent
Seifert

(10) Patent No.: US 6,340,204 B1
(45) Date of Patent: Jan. 22, 2002

(54) MOTOR VEHICLE ROOF WITH INSERTED ROOF MODULE AND INSTALLATION PROCESS FOR IT

(75) Inventor: Wolfgang Seifert, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/560,146

(22) Filed: Apr. 28, 2000

(30) Foreign Application Priority Data

Apr. 29, 1999 (DE) .......................................... 199 19 505

(51) Int. Cl.$^7$ ................................................. B60J 7/00
(52) U.S. Cl. .................. 296/216.07; 296/197; 296/210; 296/214
(58) Field of Search ................................ 296/196, 197, 296/210, 218, 214, 216.07

(56) References Cited

U.S. PATENT DOCUMENTS

| | | | | |
|---|---|---|---|---|
| 2,106,677 A | * | 1/1938 | Ledwinka | .................... 296/210 |
| 3,833,254 A | * | 9/1974 | Renner | ........................ 296/210 |
| 5,018,781 A | | 5/1991 | Kumasaki et al. | |
| 5,540,478 A | | 7/1996 | Schüch | ........................ 296/210 |

FOREIGN PATENT DOCUMENTS

| | | | | |
|---|---|---|---|---|
| DE | 1 630 925 | | 7/1971 | |
| DE | 32 22 419 | | 12/1983 | |
| DE | 3441602 | * | 3/1986 | .................. 296/210 |
| DE | 37 25 807 A1 | | 2/1988 | |
| DE | 3725807 | * | 2/1988 | .................. 296/210 |
| DE | 38 10 268 A1 | | 10/1988 | |
| DE | 43 13 555 | | 5/1994 | |
| DE | 195 02 019 | | 8/1996 | |
| DE | 197 09 016 | | 9/1998 | |
| EP | 0 214 138 | | 3/1987 | |
| FR | 1318815 | * | 1/1963 | .................. 296/210 |
| FR | 2529844 | * | 1/1984 | .................. 296/210 |
| FR | 2643034 | * | 8/1990 | .................. 296/197 |
| JP | 116269 | * | 7/1983 | .................. 296/210 |
| NL | 8006431 | * | 6/1982 | .................. 296/210 |

OTHER PUBLICATIONS

Dr.–Ing. A. Weissbrich Et Al., Moduldachsysteme Für Eine Kundengerechte Fahrzeugindividualisierung, VDI–Reports No. 1264, 1264, 1996, pp. 513 to 534.

* cited by examiner

*Primary Examiner*—Dennis H. Pedder
(74) *Attorney, Agent, or Firm*—Nixon Peabody LLP; David S. Safran

(57) ABSTRACT

A motor vehicle roof with a roof opening (18) between two lateral side members (14) attached to the vehicle, on which a pre-mounted roof module (10) which covers the roof opening is fixed. The roof module (10) is made on the two sides which engage the side members (14) such that a rigid top part (30) rests on the respective side member, while a lower, essentially rigid bottom part (28) which, however, is preferably flexible, at least in the edge area, fits under the respective side member. The vehicle roof is made such that the roof module, for attachment to the side members, can be pushed from the front or the rear into the side members. A process for producing one such motor vehicle roof involves inserting the pre-mounted roof module into the side members from one of front and rear ends thereof; resting a rigid upper part of each of two lengthwise sides of the roof module on a respective one of the lateral side members, while an essentially rigid lower part of each of the two lengthwise sides of the roof module is fit under the respective side member; and then, attaching the roof module to the side members.

8 Claims, 2 Drawing Sheets

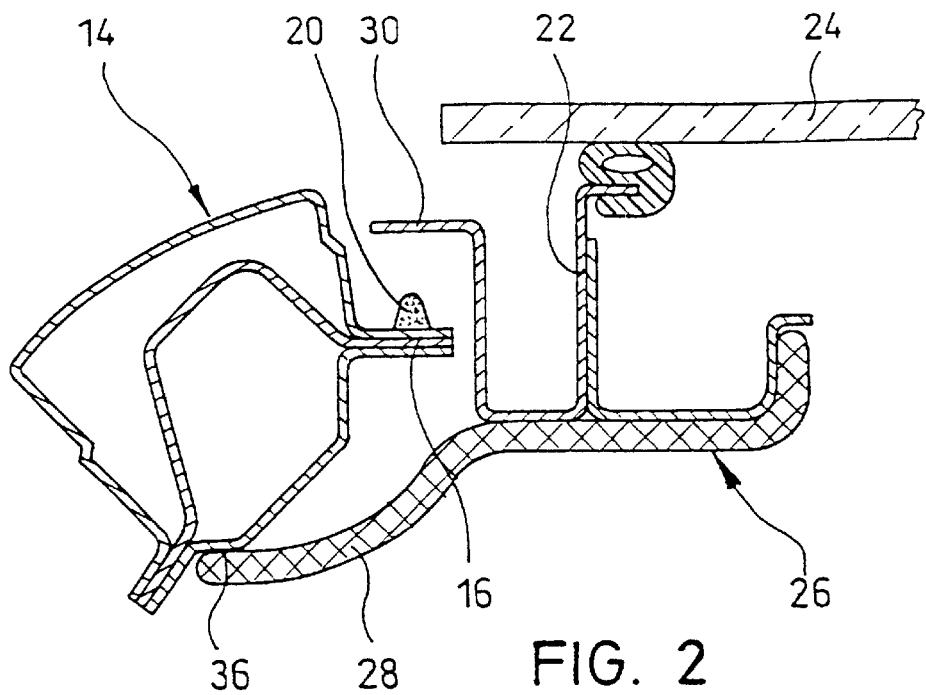
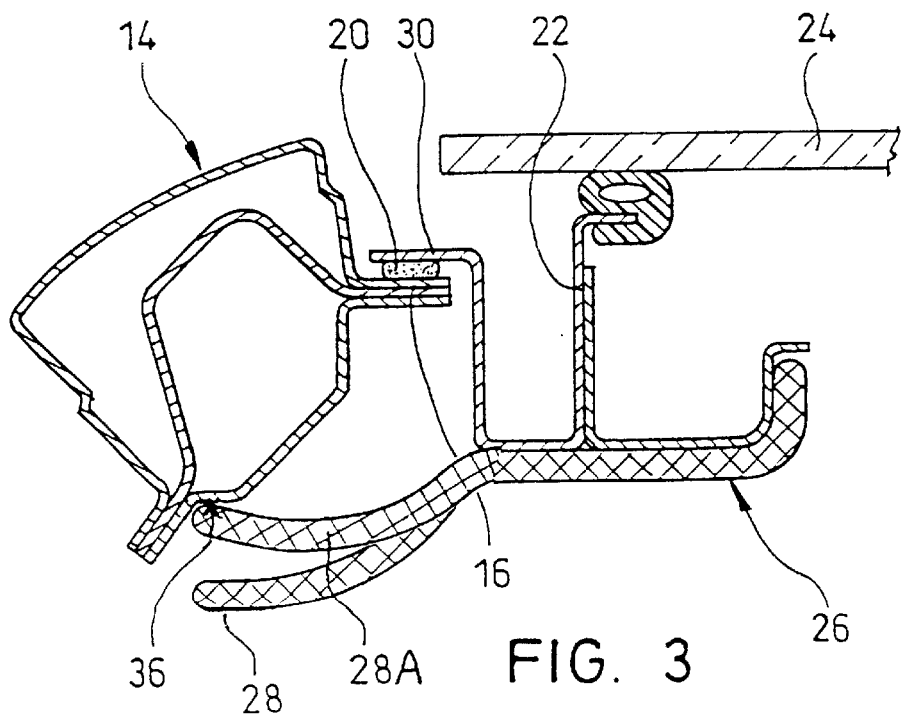

MOTOR VEHICLE ROOF WITH INSERTED ROOF MODULE AND INSTALLATION PROCESS FOR IT

BACKGROUND OF THE INVENTION

1. Field of the Invention

This invention relates to a motor vehicle roof with a roof opening between two lateral side members attached to the vehicle, on which a pre-mounted roof module which covers the roof opening is attached and to a process for making such a roof.

2. Description of Related Art

A motor vehicle roof of the above mentioned type is known, for example, from published German Patent Application DE 197 09 016 A1. In this motor vehicle roof, a pre-mounted roof module is placed from above on a roof opening which is surrounded by the body frame and is attached to the body frame. The roof module comprises a rigid cover which in its dimensions corresponds essentially to the body frame, and a headlining which is located underneath the cover and which in its peripheral edge areas projects above the cover, and thus also the body frame. This projecting edge area of the headlining is made flexible so that when the roof module is installed on the body frame, upon passage through the body frame it can be bent downward without residual deformation, it being subsequently possible to bend back the edge area of the headlining in order to cover the body frame from underneath.

A similar roof module is also described in A. Weissbrich et al. VDI-Reports No. 1264, 1996, pages 513 to 534.

The disadvantage in these roof modules is that the bendable edge area of the headlining leads to additional costs, and as a result of the additional joints in the four corner areas, to disadvantages in the design.

German Patent DE 195 02 019 C1 discloses a motor vehicle roof in which a roof module which has two side parts which comprise one lengthwise spar each and one B-column, a roof plate and a cross spar is placed at the height of the equator on the shell of a motor vehicle and is attached to the shell.

German Patent DE 43 13 555 C1 and corresponding U.S. Pat. No. 5,540,478 disclose a motor vehicle roof with a roof module which comprises a module frame which is composed of two side members and three cross members and which can be screwed between the two side members of the body at stipulated attachment points which are made as screw-in sleeves in the side members of the body, in a roof opening which extends between the side members of the body, the screwing into the screw-in sleeves taking place from the inside. The attached module frame can extend from the front window of the motor vehicle as far as its rear window.

Other motor vehicle roofes with transversely braced module frames are known, for example, from published German Patent Application Nos. DE 32 22 419 A1 and DE-AS-1 630 925.

SUMMARY OF THE INVENTION

The primary object of this invention is to devise a motor vehicle roof with a pre-mounted roof module which is made simple and economical, and still can be easily installed on two lateral side members attached to the vehicle. Furthermore a related object of this invention is to devise a corresponding installation process.

The aforementioned objects are achieved in accordance with the invention by a motor vehicle roof having a roof module made on the two sides which engage the side members such that a rigid top part rests on the respective side members, while an essentially rigid bottom part fits under the respective side member, the vehicle roof being made such that the roof module can be pushed from the front or the rear into the side members for attachment to the side members, by such a roof module which, after attachment of the roof module, a rigid upper part of each of the two lengthwise sides of the roof module rest on the respective side member, while an essentially rigid lower part of each of the two lengthwise sides of the roof module fits under the respective side member, and by an installation process for installation of a pre-mounted motor vehicle roof module for covering a vehicle roof opening between two lateral side members attached to the vehicle, the pre-mounted roof module being pushed into the side members from the front or from the back, after insertion a rigid upper part of each of the two lengthwise sides of the roof module resting on the respective side member, while an essentially rigid lower part of each of the two lengthwise sides of the roof module fits under the respective side member, and then the roof module is attached to the side members.

In the motor vehicle roof or installation process in accordance with the invention, it is advantageous that the lower part of the roof module which fits under the respective side member is made essentially rigid, i.e., simple and aesthetically pleasing and still, by the corresponding configuration of the roof module and the motor vehicle roof, simple installation is possible, since the roof module, during installation, can be pushed into the side members of the motor vehicle roof. In doing so, the lower part of the roof module can preferably have a slight flexibility which facilitates the insertion of the roof module and guarantees that the lower part of the roof module, which is made preferably as the edge area of the stationary inside headlining, after cementing the roof module to the side members, adjoins the roof spars as close as possible from underneath. Furthermore, less height above the assembly belt at the passenger car assembly plant is necessary due to the installation from the front.

For transverse stiffening of the motor vehicle roof, preferably at least one cross member is integrated into the roof module for joining the two side members. Here, preferably for a roof module which can be inserted from the front or from the back, the front and the rear cross member of the motor vehicle roof is replaced by a corresponding integrated cross member of the roof module. In this way, it easily becomes possible to push the roof module into the side members without a corresponding loss of stability of the motor vehicle roof as a whole occurring.

In another preferred embodiment of the invention, the two side members are provided with an essentially horizontal support flange for the roof module on which the upper rigid part rests with the roof module attached and is preferably attached by means of a bead of cement. The rigid upper part is preferably part of the module frame.

The installation process according to the invention is preferably developed such that, before inserting the roof module, a bead of cement is applied to each side member, during insertion, the roof module is moved at a certain height so that the distance of the rigid upper part to the bead of cement is sufficient to prevent contact, and after reaching the end position of the roof module, the module is lowered onto the bead of cement so that the bead, after setting, produces a solid connection between the roof module and the side members.

The height of the roof module when inserted is determined by the robot. If necessary, the side members on their bottom can each have a support surface on which the outside edge of the inside headlining of the motor vehicle, when the module is inserted, can be held down until this outside edge springs back elastically after the module is seated on the flange with the bead of cement.

To increase the stability of the roof, the cross member or each cross member which has been integrated into the roof module can be screwed onto the bead of cement with the side members after the roof module is lowered.

In the following, one embodiment of the invention is detailed by way of example using the attached drawings.

BRIEF DESCRIPTION OF THE DRAWINGS

FIG. 2 is a sectional view along the line II—II in FIG. 1; however, with the roof module being pushed into the side members of the body, but not yet being attached to the side members; and FIG. 3 is a view similar to FIG. 2, but with the roof module being shown at the end of the installation process in the state attached to the side members of the body.

DETAILED DESCRIPTION OF THE INVENTION

Figure 1:
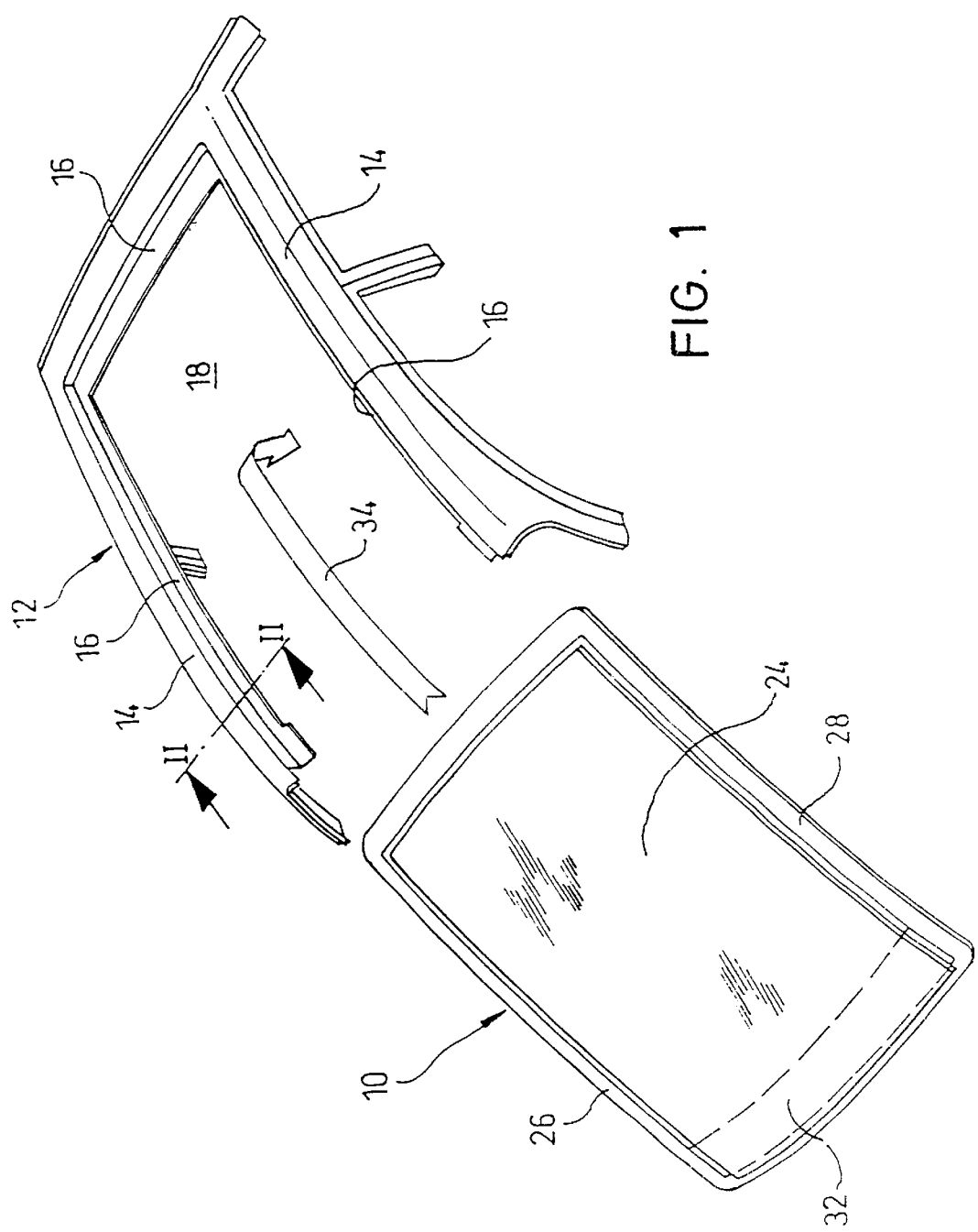
FIG. 1 is a perspective view of a motor vehicle roof in accordance with the invention with a roof module at the start of installation of the roof module.

FIG. 1 shows a pre-mounted roof module 10 at the start of installation in a roof or a shell 12 of a motor vehicle. The roof 12 comprises two lateral side members 14 which run in the lengthwise direction of the roof and each of which have an essentially horizontally running support flange 16, between which a roof opening 18 is formed. In the back area of the motor vehicle roof 12, the support flange 16 extends between the two side members 14, and thus, forms the rear boundary of the roof opening 18. On the support flange 14 or on the bottom of the module frame 22 (in the peripheral edge area 30), there is a bead 20 of cement (not shown in FIG. 1). As shown in FIG. 1, there are no cross members on the motor vehicle roof 12, at least not in the front area of the roof opening 18.

The roof module 10 comprises a module frame 22 which runs over the entire periphery of the roof module 10 and bears one or more stationary or movable module parts, such as, for example, a module cover 24 and a stationary inside headlining 26 which is located underneath the module parts and which extends at least in the edge area of the module roof. The peripheral edge area 28 of the stationary inside headlining 26 projects laterally above and beyond the module cover 24 and runs from the frame 22, for example, obliquely downward. The stationary inside headlining 26, especially its peripheral edge area 28, is made essentially rigid, i.e., cannot be folded, but is elastically deformable at least in its height, which is somewhat greater than that of the bead 20 of cement. Furthermore, the frame 22 comprises an essentially rigid peripheral edge area 30 which also projects laterally beyond the module cover 24.

The roof module 10 is additionally provided with at least one front cross member 32 which is integrated into the roof module. The roof module 10 can have an opening which can be closed by a displaceable cover and can be selectively exposed, at least partially. Furthermore, the roof module 10 can contain additional components, such as, for example, solar generators, ventilation elements and the like. The roof module 10 and the motor vehicle roof 12 or the shell are made such that the pre-mounted roof module 10 can be pushed from the front into the side members 14 for purposes of subsequent attachment by means of the bead 20 of cement on the side members 14 in order to cover the roof opening 18. Proceeding from the position shown in FIG. 1, the pre-mounted roof module 10 is pushed in the direction of the arrow 34 into the side members 14, the support flange 16 being located between the peripheral part 30 of the frame and the edge area 28 of the stationary inside roof lining. The height of the roof module is determined by a support surface 36 of the side members 14 against which the outermost edge of the peripheral edge area 28 of the stationary inside roof lining lies from underneath. This height is chosen such that there is a sufficient distance between the bead 20 of cement on the support flange 16 and the peripheral part 30 of the module frame 22 so that there is no contact with the bead 20 of cement when the roof module 10 is pushed in. When the roof module 10 has reached its horizontally correct position, the roof module 10 is lowered as a whole so that the peripheral edge area 30 of the module frame 22 comes to rest on the bead 20 of cement which is supported by the support flange 16, see FIG. 3. In this position, the cross member 32 can be screwed to the side members 14 to increase stability in order to stiffen the motor vehicle roof 12 in the transverse direction and thus compensate for the absence or the reduction of the cross member of the body roof.

When the bead 20 of cement has hardened in the position which is shown in FIG. 3, the installation process of the roof module 10 has been completed. In doing so, the edge area 28 of the stationary inside roof lining preferably, as shown in FIG. 3 with 28A, automatically adjoins the support surface 36 of the side member 14 from underneath as a result of its elasticity.

While a single embodiment in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Motor vehicle roof with a roof opening within a roof frame having at least one open end and comprising two lateral side members of the vehicle, a roof module which covers the roof opening, wherein the roof module has a rigid top part which is affixed on top of each of the two lateral side members by a bead of an adhesive material and a bottom part which fits under each side member and is elastically deflectable in a heightwise direction of the roof by an amount greater than a height of the adhesive material, the roof module being insertable into the open end of the roof frame to between the lateral side members from one of front and rear ends of the lateral side members with a mounting portion of said rigid top part above and out of contact with the adhesive on lateral side members and with said deflectable bottom part under each side member.

2. Motor vehicle roof as claimed in claim 1, wherein the bottom part is an edge area of a stationary inside headlining.

3. Motor vehicle roof as claimed in claim 1, wherein at least one cross member is integrated into the roof module and is connectable to the two lateral side members at the at least one open end of the roof frame for transverse stiffening of the motor vehicle roof with the roof module attached.

4. Motor vehicle roof as claimed in claim 1, wherein the two lateral side members are provided with an essentially horizontally extending support flange on which the roof module is attached via the rigid top part.

5. Motor vehicle roof as claimed in claim 4, wherein the support flange, on the end of the side members from which the roof module is not inserted, forms a connection between the side members.

6. Motor vehicle roof as claimed in claim 5, wherein the rigid top part is attached by a bead of cement on the support flange.

7. Motor vehicle roof as claimed in claim 1, wherein the rigid top part is part of a module frame.

8. Motor vehicle roof as claimed in claim 1, wherein the roof module has a roof opening which is closed by at least one cover which is selectively displaceable to at least partially expose the roof opening.

\* \* \* \* \*